United States Patent
Ostrow et al.

(10) Patent No.: US 7,398,988 B2
(45) Date of Patent: Jul. 15, 2008

(54) THREE-WHEELED STROLLER HAVING KICKSTAND

(76) Inventors: Kenneth P. Ostrow, 22950 Summit Rd., Los Gatos, CA (US) 95033; Kerry Williams, 1550 Trevor Dr., San Jose, CA (US) 95033

( * ) Notice: Subject to any disclaimer, the term of this patent is extended or adjusted under 35 U.S.C. 154(b) by 594 days.

(21) Appl. No.: 10/933,915

(22) Filed: Sep. 2, 2004

(65) Prior Publication Data

US 2006/0043689 A1 Mar. 2, 2006

(51) Int. Cl.
*B62B 7/08* (2006.01)
(52) U.S. Cl. ...................... 280/642; 280/293
(58) Field of Classification Search .......... 280/642, 280/641, 643, 644, 647, 650, 657, 658, 30, 280/301, 304, 293, 298, 47.38, 47.33, 763.1, 280/755, 295, 43.14, 47.2, 648; 248/352
See application file for complete search history.

(56) References Cited

U.S. PATENT DOCUMENTS

| | | | | |
|---|---|---|---|---|
| 1,761,679 A * | 6/1930 | Quickert | ................... | 280/295 |
| 2,353,326 A * | 7/1944 | Troendle | ................... | 280/755 |
| 2,456,250 A * | 12/1948 | Boudreau | ............... | 280/763.1 |
| 3,800,618 A | 4/1974 | Yoshigai | | |
| 4,241,933 A * | 12/1980 | Gratza et al. | ................ | 280/301 |
| RE30,867 E * | 2/1982 | Gaffney | ....................... | 280/642 |
| 4,632,409 A * | 12/1986 | Hall et al. | ..................... | 280/30 |
| 4,846,486 A * | 7/1989 | Hobson | .................... | 280/47.25 |
| 4,934,728 A * | 6/1990 | Chen | .......................... | 280/644 |
| 5,090,724 A * | 2/1992 | Fiore | .......................... | 280/643 |
| 5,301,963 A * | 4/1994 | Chen | .......................... | 280/30 |
| 5,370,408 A * | 12/1994 | Eagan | ................... | 280/33.994 |
| 5,511,802 A | 4/1996 | Aitken | | |
| 5,725,238 A * | 3/1998 | Huang | ........................ | 280/642 |
| 5,887,486 A | 3/1999 | Lin et al. | | |
| 6,152,476 A * | 11/2000 | Huang | ........................ | 280/642 |
| 6,378,890 B1 * | 4/2002 | Cheng | ........................ | 280/642 |
| 6,561,526 B1 * | 5/2003 | Towns | ........................ | 280/30 |
| 6,698,772 B1 * | 3/2004 | Cervantes | ................ | 280/47.35 |
| 7,011,316 B1 * | 3/2006 | Peridon | ....................... | 280/30 |
| 7,014,203 B2 * | 3/2006 | Liu | .............................. | 280/293 |

FOREIGN PATENT DOCUMENTS

FR  2 871 132  * 12/2005

* cited by examiner

*Primary Examiner*—Russell D. Stormer
*Assistant Examiner*—Bridget Avery
(74) *Attorney, Agent, or Firm*—Roberts Mardula & Wertheim, LLC (57) ABSTRACT

A three-wheeled stroller has a kickstand movable between a retracted position and a deployed position. When deployed, the kickstand has a pair of downwardly extending legs on either side of the front wheel to help prevent a tipping condition when an occupant enters or exits the stroller. Either a foot-operated actuator or a hand-operated actuator may be used to remotely operate the kickstand. In the case of a foot-operated actuator, stepping on a foot-operated brake bar can both operate the kickstand and immobilize one or more rear wheels to brake the stroller.

25 Claims, 11 Drawing Sheets

Fig. 7a

THREE-WHEELED STROLLER HAVING KICKSTAND

FIELD OF THE INVENTION

The present invention relates to a three wheeled or "jogging" stroller for an infant or toddler. More particularly, it concerns such a stroller having a remotely operated kickstand that helps prevent tipping when the occupant climbs on or climbs off the unit or hangs over its side, or if the unit receives a sideways force from an inadvertent bump.

BACKGROUND OF THE INVENTION

Figure 1:
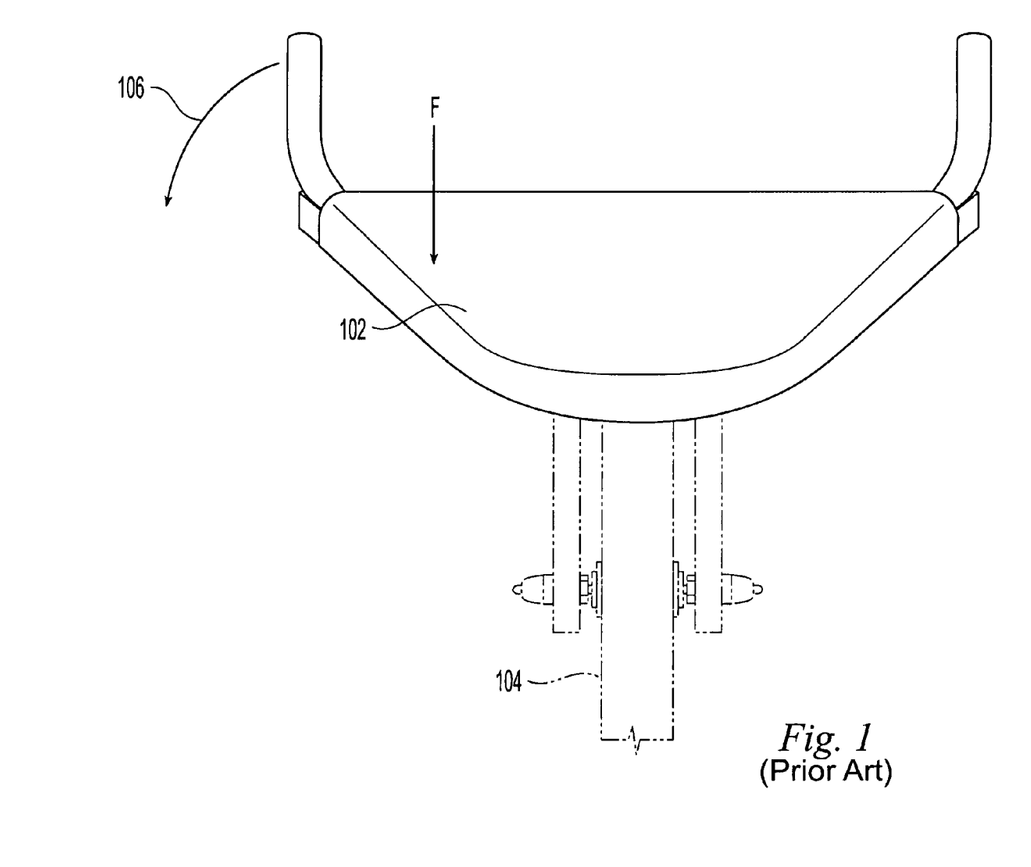
FIG. 1 is a front view of the front portion of a prior-art three-wheeled stroller.

Three-wheel strollers, often referred to as "jogging strollers", have a triangular wheel arrangement including a single front wheel and two rear wheels. When viewed from either the front or rear, the front wheel is midway between the rear wheels. At the front of the stroller, the carriage narrows to a forward portion onto which an occupant may climb while entering the stroller. As illustrated in FIG. 1, if an occupant applies to the front frame cover 102 above the front wheel, a large downward force F that is off-center relative to the front wheel 104, a tipping moment may be created, causing the stroller to tip over, as depicted by the arrow 106. This tipping is exaggerated when the front wheel is rotated perpendicular to the centerline of the jogger.

U.S. Pat. No. 5,511,802 discloses a single wheel baby stroller having a manually operated kickstand.

BRIEF SUMMARY OF THE INVENTION

In one aspect, the present invention is directed to a three-wheeled stroller comprising a stroller frame, a front wheel and a pair of rear wheels, and a kickstand movable between a retracted position and a deployed position. The kickstand includes at least one leg extending downwardly on one side of the front wheel in a front view of the stroller, when the kickstand is in the deployed position.

In a preferred embodiment, the kickstand is remotely operated, such as by a foot-operated, or a hand-operated, actuator. Furthermore, the kickstand preferably has two legs, one on either side of the front wheel.

A cable operatively connected to the actuator is provided to adjust the kickstand between the retracted and deployed positions. The cable may be connected to a brake bar which, in use, is normally foot-operated. The brake bar may also used to immobilize at least one of the rear wheels at the same time. The brake bar is captured by an actuator locking assembly that preferably is mounted on an axle connecting the rear wheels. The actuator locking assembly comprises a fixed member mounted on the axle, and a movable member mounted on the fixed member and configured to move relative to the fixed member. A portion of the movable member is provided with an initial abutment surface, a concave receiving portion adjacent to the initial abutment surface, the concave receiving portion being configured to receive at least a portion of a foot-operated actuator, and a release surface which, when pushed, causes the movable member to move relative to the fixed member in a direction of the axle.

In another aspect, the present invention is directed to an improvement in a three-wheeled stroller having a front wheel and a pair of rear wheels, The improvement comprises a cable-operated kickstand movable between a retracted position and a deployed position, the kickstand comprising a pair of legs extending downwardly on either side of the front wheel in a front view of the stroller, when the kickstand is in the deployed position.

In yet another aspect, the present invention is directed to a method of deploying a kickstand that helps prevent tipping of a three-wheeled stroller. The method comprises stepping on a foot-operated actuator to thereby cause a cable to pull on a lever operatively connected to a pair of retracted legs of the kickstand, whereby the legs move downward into a deployed position and, simultaneously, at least one rear wheel of the three-wheel stroller is immobilized.

In still another aspect, the present invention is directed to a stroller comprising a stroller frame, at least one front wheel and a pair of rear wheels, and a brake bar locking assembly mounted on an axle connecting the rear wheels. The brake bar locking assembly comprises a fixed member mounted on the axle, and a movable member mounted on the fixed member and configured to move relative to the fixed member. A portion of the movable member is provided with an initial abutment surface, a concave receiving portion adjacent to the initial abutment surface, the concave receiving portion being configured to receive at least a portion of a brake bar, and a release surface which, when pushed, causes the movable member to move relative to the fixed member in a direction of the axle.

BRIEF DESCRIPTION OF THE DRAWINGS

The present invention will now be described with respect to the following figures in which.

DETAILED DESCRIPTION OF THE INVENTION

Figure 2:
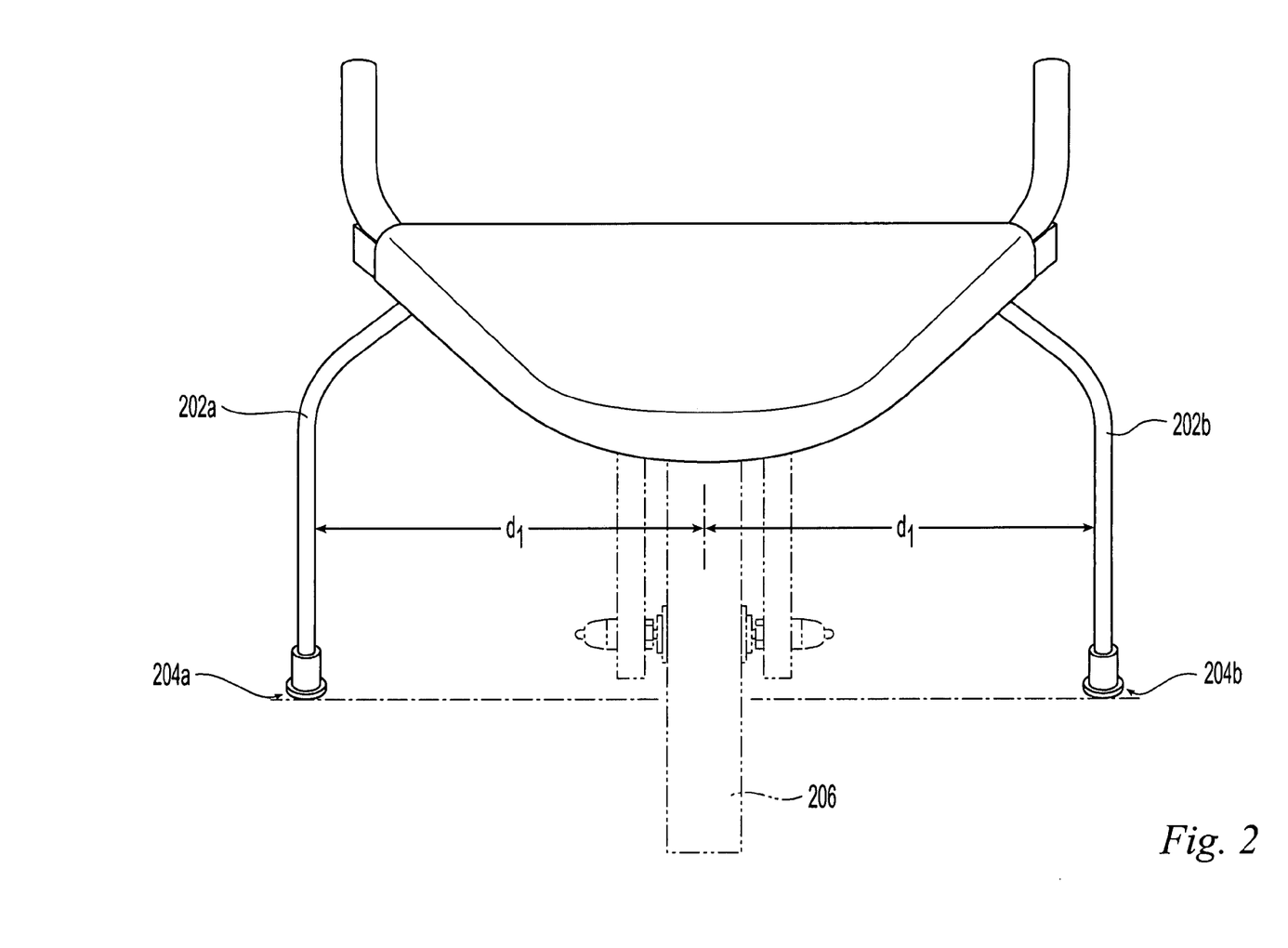
FIG. 2 is a front view of the front portion of a three-wheeled stroller in accordance with the present invention showing the kickstand in the deployed position.
Figure 3A:
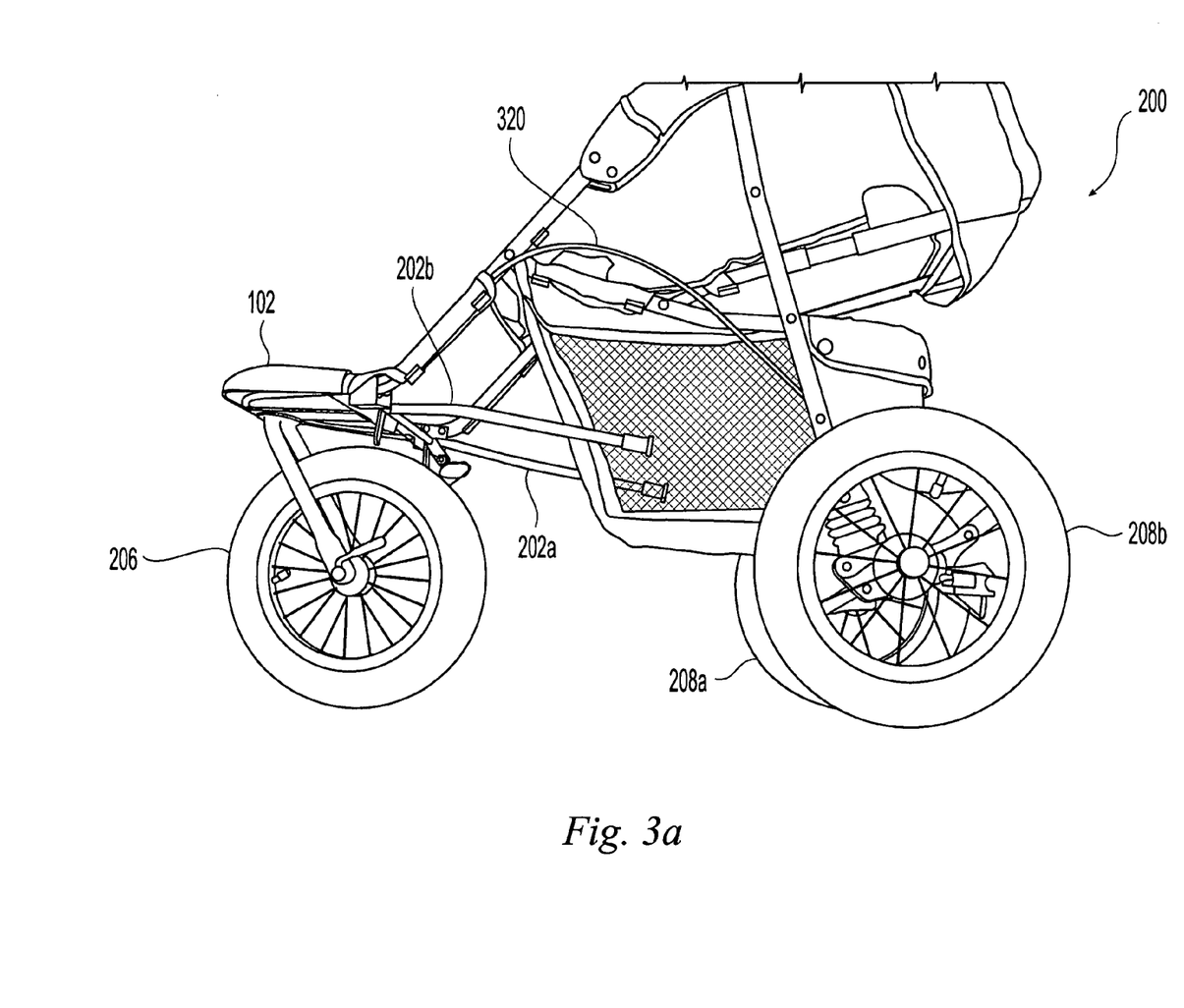
FIG. 3a shows a three-wheel stroller in accordance with the present invention with the kickstand in the retracted position.
Figure 3B:
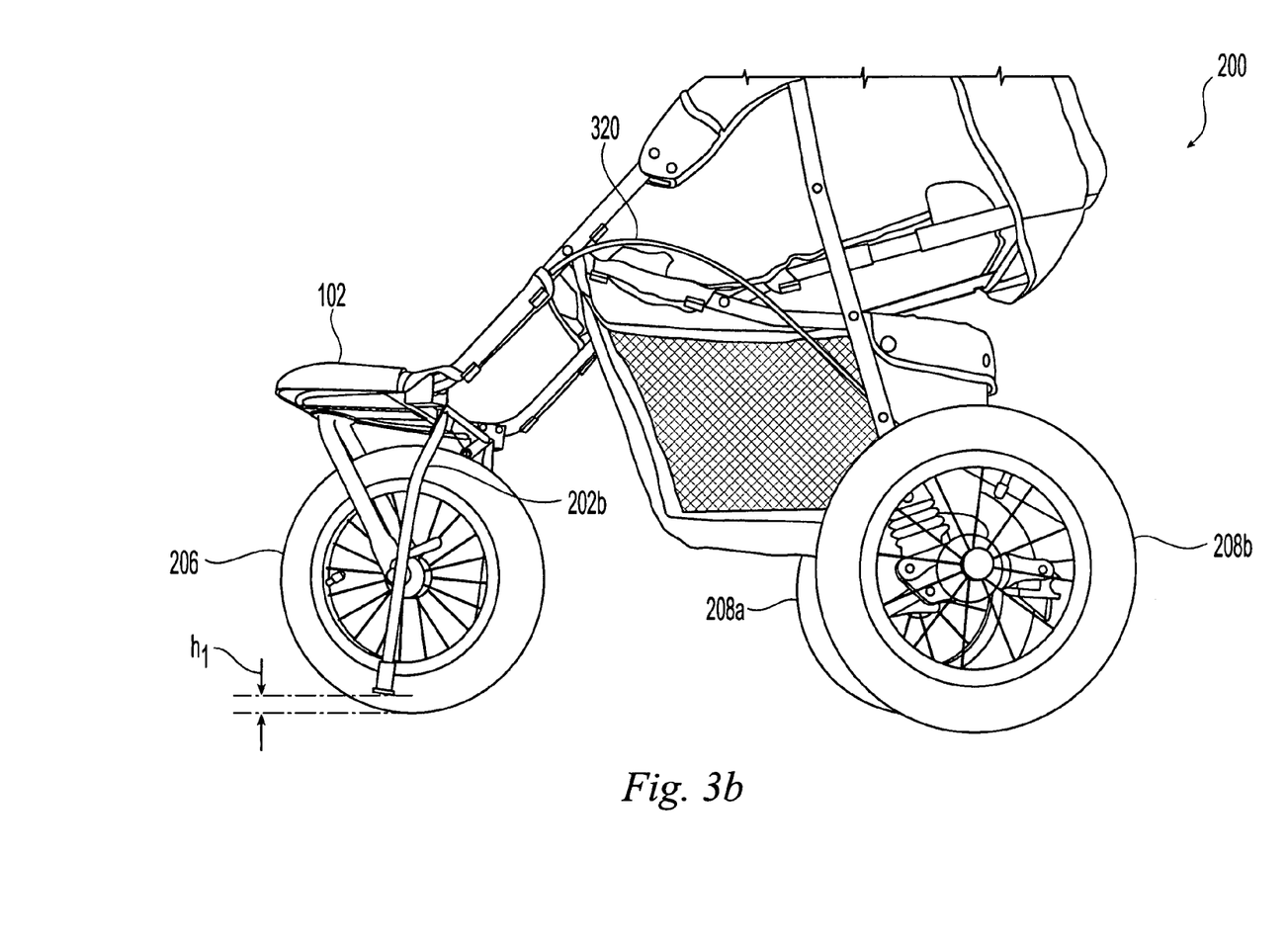
FIG. 3b shows a three-wheel stroller in accordance with the present invention with the kickstand in the deployed position.

As seen in FIG. 2, in accordance with one embodiment of a stroller 200 of the present invention, a pair of downwardly extending legs 202a, 202b are deployed to help stabilize the front portion of the stroller when the stroller is configured to hold an occupant to prevent accidental tipping from improper use or accidental forces.

The legs 202a, 202b, belong to a kickstand 302. In the present description, the term 'kickstand' does not necessarily mean that the device must be 'kicked'; as discussed below, it may be remotely operated by foot- or hand-operated actuator.

Furthermore, the lowermost portion 204a, 204b of each leg of the kickstand 302 does not extend in the downward direction as far as the front wheel 206. Instead, when viewed from the front, each leg preferably has a clearance of height h1 relative to a flat ground surface, when the stroller is 'balanced' from left to right. Preferably, the clearance height h1 is between 0.5 cm and 2.5 cm, though other heights may be acceptable, too. The lower, or minimum clearance value, helps ensure that the legs can be moved between the retracted position and the deployed position without obstruction from small elevations, bumps and other projections in the ground surface below the stroller. It also provides some degree of tolerance for tire deflations. The higher, or maximum, clearance value provides a limit to the degree of tipping that is tolerated.

One or both of the lowermost portions 204a, 204b of the legs may be provided with lateral members that extend parallel to the ground. In such case, one or both of the lowermost portions may terminate in an inverted "T" or "L" shaped member.

When viewed from the front, a downwardly straight portion of the legs 202a, 202b are a distance d1 from the center of the from wheel 206. In a preferred embodiment, distance d1 is between 15 cm and 25 cm, and more preferably is about 21 cm. Preferably, the distance between the legs, or twice d1, is greater than a height of the front wheel. In the environment of a preferred embodiment, the front wheel 206 is the same size as the identical rear wheels 208a, 208b which are connected by axle 512. It is noted, however, that the present invention equally applies to three-wheel strollers having a front wheel that differs in size from the rear wheels.

Figure 4A:
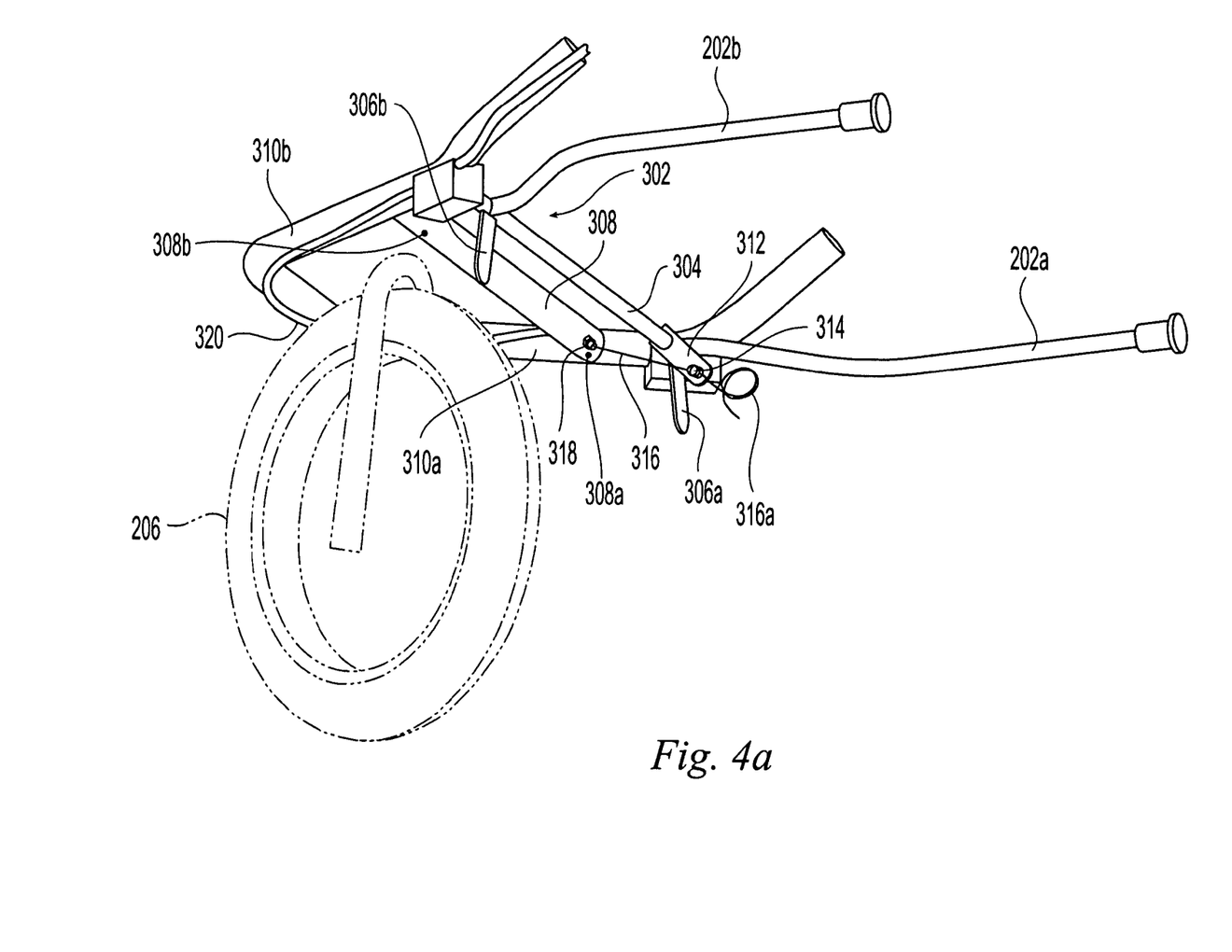
FIG. 4a shows the front underside of the stroller in the retracted position.
Figure 4B:
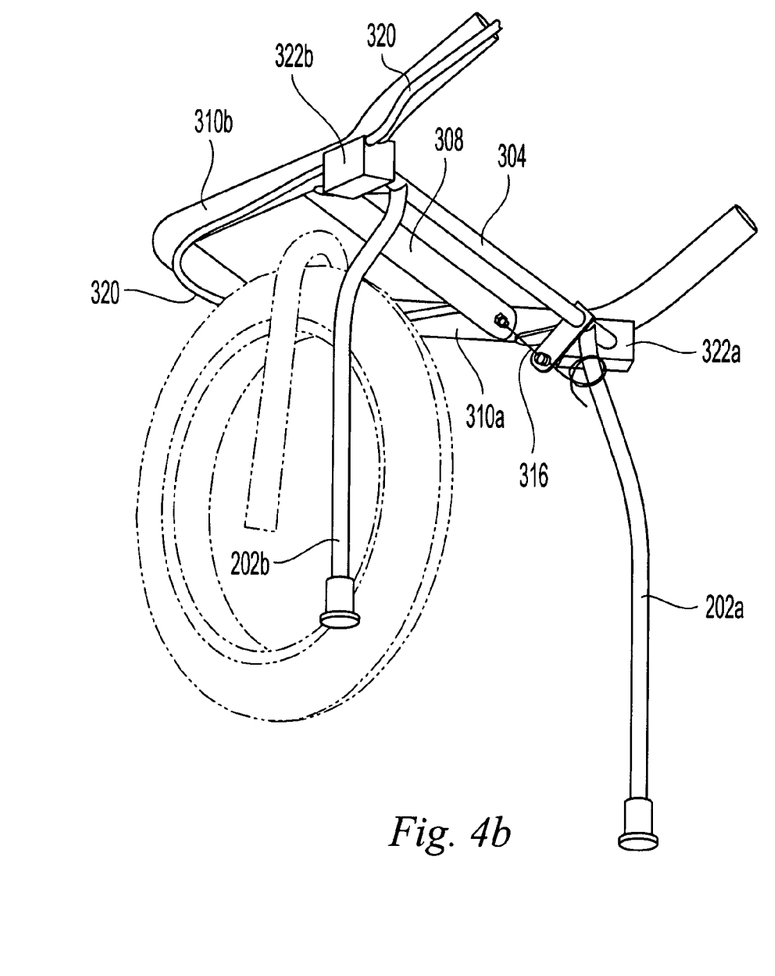
FIG. 4b shows the front underside of the stroller in the deployed position.
Figure 4C:
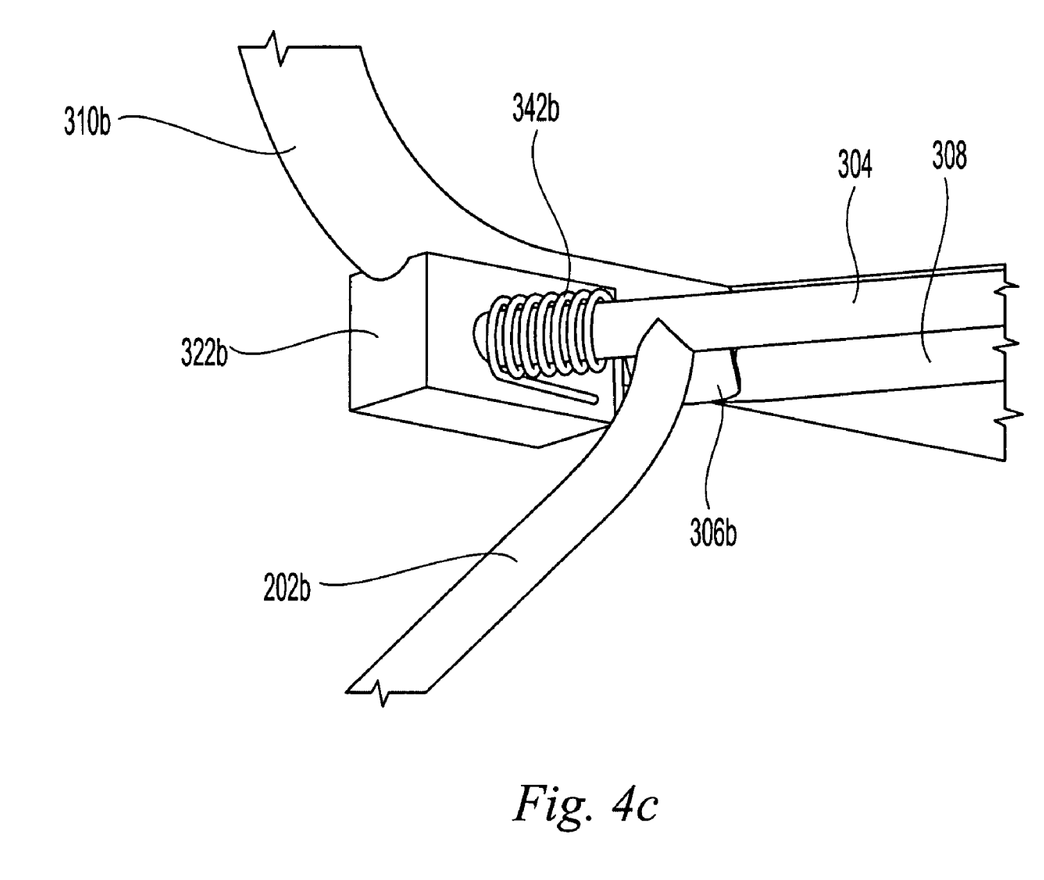
FIG. 4c shows a torsion spring mounted on the horizontal rod between a leg and a housing.

As seen in FIGS. 4a & 4b, a kickstand 302 comprises legs 202a, 202b mounted to a horizontal rod 304. Ends of the rod 304 are rotatably mounted within housings 322a, 322b attached to the stroller frame. As seen in FIG. 4c, a first torsion spring 342b is coaxially mounted on rod 304 between where the leg 202b is connected to the rod 304 and the housing 322b. The torsion spring 342b is configured to bias the rod 304, and thus the kickstand 302 into the retracted position with legs 202a, 202b in a substantially horizontal position. It is understood that a second torsion spring (not shown) is similarly mounted on rod 304 between leg 202a and housing 322a.

The legs 202a, 202b preferably belong to a unitary one-piece U-shaped construction that is then attached by welding or by a fastener such as a screw, rivet or bolt, or the like, to a straight member forming the rod 304. Alternatively, the legs may be separately attached to a straight member forming the rod 304. The rod and legs may be fabricated from any of a number of materials such as a metal, a metal alloy, graphite, fiberglass, plastic or one of any number of composites.

The kickstand 302 also comprises a pair of spaced apart, rigidly mounted projecting tabs 306a, 306b that are connected to, and project outwardly from the rod 304. The tabs prevent over-rotation of the kickstand 302 when it moves from the retracted position to the deployed position. When the kickstand 302 rotates to the deployed position, the tabs 306a, 306b, which rotate with the rod, may strike a pair of abutment surfaces 308a, 308b, thereby arresting excessive rotation of the kickstand. The abutment surfaces 308a, 308b preferably are formed on an external surface of a horizontal brace 308 connecting opposing wheel support frame members 310a, 310b of the stroller. It is understood however, that the tabs 306a, 306b may be configured and dimensioned to strike some other fixed portion of the stroller frame, i.e., a portion that does not rotate with the kickstand 302.

The kickstand 302 also comprises a front lever arm 312 having a first end attached to horizontal arm 304 on one side of the stroller. Front lever arm 312 extends radially outward from the horizontal arm 304 and terminates in a distal second end. A cable-tightening nut 314 is provided proximate the distal second end of the front lever arm 312.

In the foregoing description, the ends of the legs 202a, 202b are shown as being separate. It is understood, however, that the legs may be connected at or near their ends by a crossbar, so long as the resulting structure does not interfere with wheel. For instance, if in the deployed position, the legs were behind the front wheel, they could be connected at or near their ends.

It is also understood that instead of a pair of legs, a single leg with a lateral extension at its lower end may be provided. In such case, the leg may have the shape of an inverted "T", with its vertical member directly behind, or even in front of, the wheel, when viewed from the side, and the top of the "T" extending parallel to the ground. Alternatively, the single leg may have the shape of an "L", with the leg to one side of the wheel and the lower portion of the "L" extending parallel to the ground, and perhaps at an angle relatively to the front of the stroller.

In one embodiment, a cable 316 is used to remotely actuate the kickstand 302 by means of a foot-operated actuator, as discussed further below. The cable 316 is secured by nut 314 with a first end 316a of the cable extending past the securing junction provided by the nut 314. The cable 316 enters a sleeve 318 that passes through a diameter of the horizontal brace 308, and then is threaded along the length of a cable conduit 320 towards the rear of the stroller 200.

From the tubular member, the cable, and thus the cable conduit 320, pass along a perimeter of the front portion of stroller, from one side to the other, upwards along a first frame member and then downwards along a right rear vertical frame member 506. The cable conduit 320 is secured by, and terminates at, a bracket 502 attached to rear cross-support member 504 (see FIG. 5a).

Figure 5A:
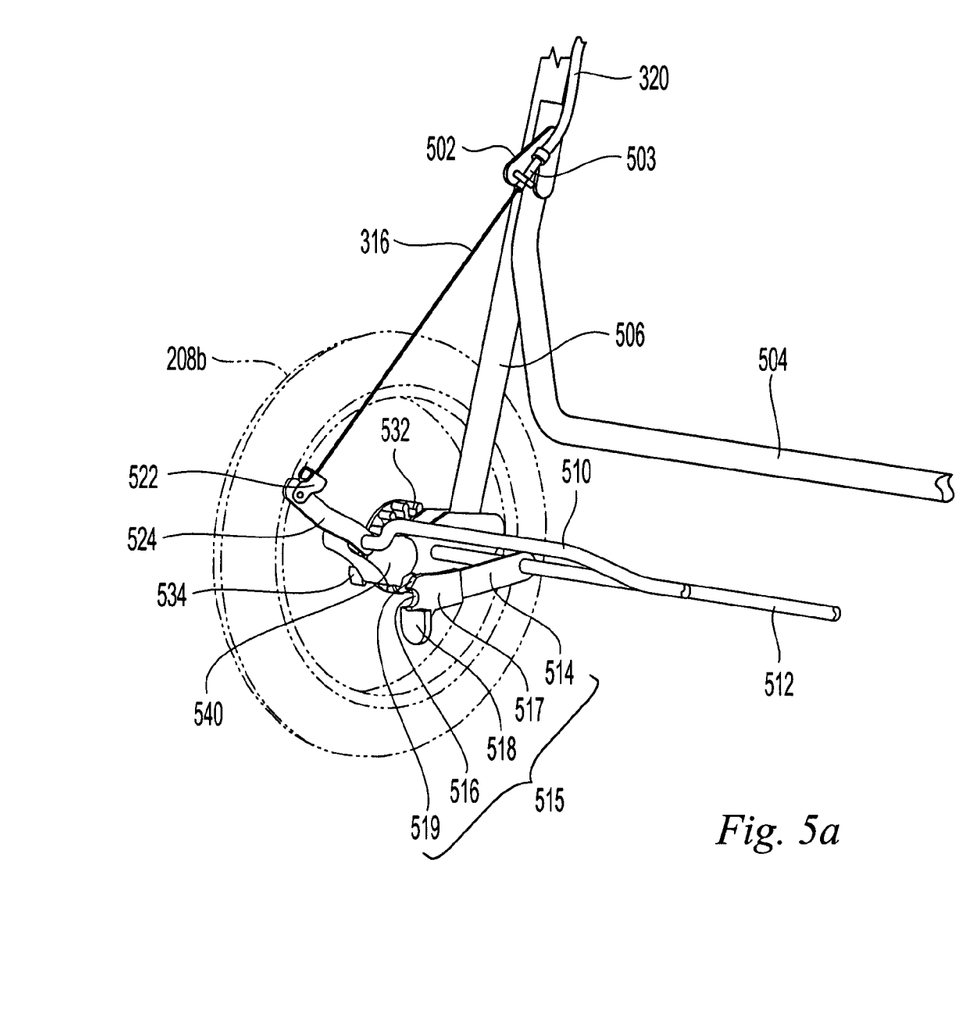
FIG. 5a shows the foot-operated mechanism in the retracted position.

The end of the cable conduit 320 is provided with an adjusting screw 503 which adjusts the length of the cable, and thus, indirectly, the vertical position of the legs 202a, 202b when deployed. Turning the adjusting screw 503 clockwise reduces the amount of force required to deploy the kickstand. Turning the adjusting screw 503 counter-clockwise increases tension on the cable and adjusts the forward lean of the legs, which preferably are vertical. The cable assembly comprising the cable 316, the cable conduit 320 and the cable adjuster 503, along with the nut 314 are similar to analogous parts known to those of ordinary skill in the bicycle arts.

The cable 316 emerges from the cable conduit 320 and is secured to a retaining clasp 522 that is configured to pivot at a distal end of the rear lever arm 524, which extends radially outwardly of a foot-operated actuator 510. The foot-operated actuator 510 preferably comprises a brake bar 510 which performs the dual actions of controlling both the kickstand 302 and a braking mechanism for the rear wheels.

As also seen in FIG. 5a, an actuator locking assembly 515, which can also be considered a brake bar locking assembly 515, preferably is mounted to the axle 512. The brake bar locking assembly 515, which extends radially outwardly of the axle 512, extends in a rearward direction of the stroller 200 and is angled slightly downward. The brake bar locking assembly 515 comprises a fixed member 514 rigidly mounted at a terminal end thereof to the axle 512 and a spring-loaded endpiece 517.

The fixed member 514 is secured to the axle 512 by welding or by a fastener such as a screw, bolt, rivet, or the like. The spring-loaded endpiece 517 is slideably mounted onto the fixed member 514 and is configured to move in a longitudinal direction therealong. Thus, from a rest position, upon application of a compressive force, spring-loaded endpiece 517 is configured to move toward the axle, thereby compressing the spring (not shown) and shortening the length of the brake bar locking assembly 515. Upon release of such a force, the spring-loaded endpiece 517 moves away from the axle 512 and returns to its original position. At its terminal end, the spring-loaded endpiece 517 is provided with a downwardly and rearwardly sloped initial abutment surface 519, an arcuate receiving portion 516 below the abutment surface 519 and a heel-shaped foot release surface 518 beneath a lower lip of the arcuate receiving portion 516.

To move the kickstand from the retracted position to a deployed position, an operator steps on the brake bar 510 until it is received into the arcuate receiving portion 516. During this process, a cylindrical portion of the brake bar 510 first contacts the sloped initial abutment surface 519. Due to the exerted foot pressure on the initial abutment surface 519, a compressive force is applied to the spring-loaded endpiece 517, which then slides inwardly along the fixed member 514, thereby allowing the cylindrical portion of the brake bar 510 to travel along the initial abutment surface 519. As the endpiece 517 continues to slide inwardly, the cylindrical portion of the brake bar 510 slips over the rearwardmost portion of the initial abutment surface 519 and is received into the arcuate receiving portion 516, where it is locked into the deployed position shown in FIG. 5b.

Figure 5B:
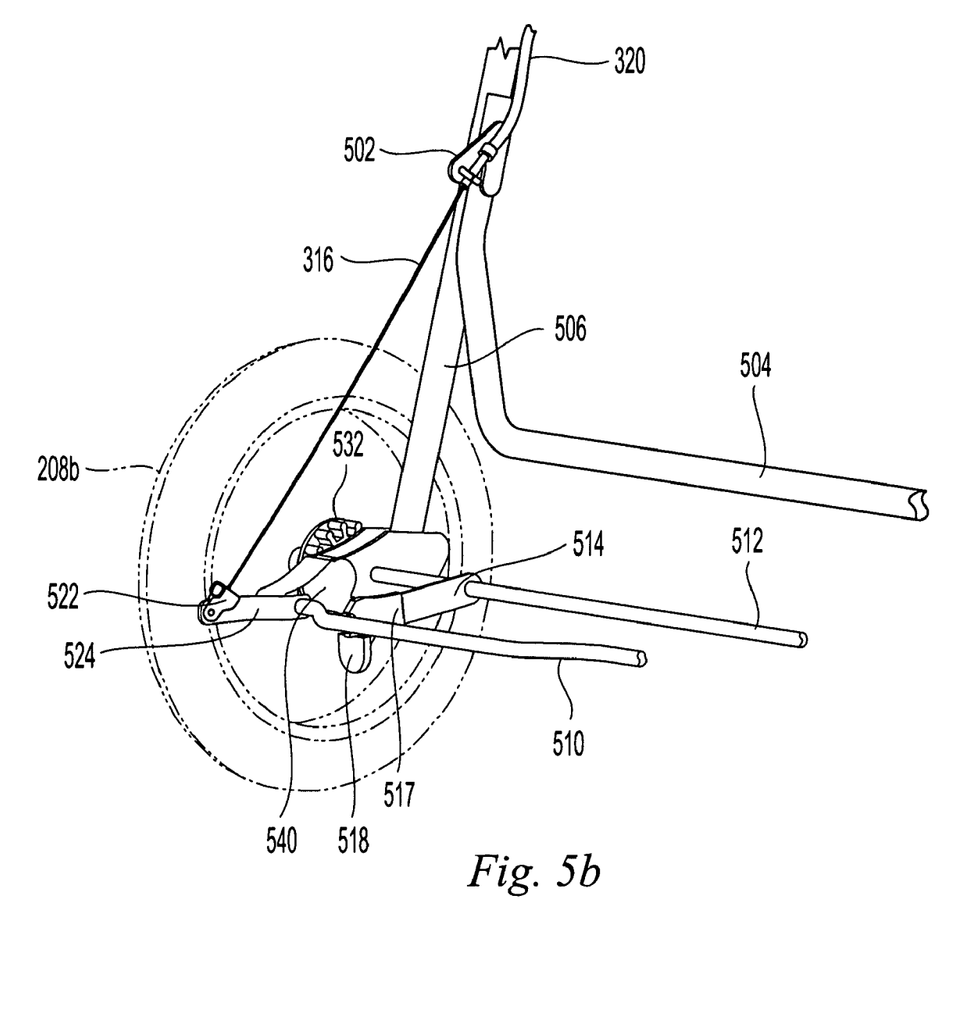
FIG. 5b shows the foot-operated mechanism in the deployed position.

As the brake bar 510 moves to the deployed position, the rear lever arm 524 rotates, thereby pulling the cable 316. At the front end of the stroller 200, the cable 316 pulls the front lever arm 312 against the biasing force of the torsion springs mounted on the rod 304, thereby rotating the horizontal arm 304 such that the legs 202a, 202b are moved into the deployed, or downward position.

Figure 6:
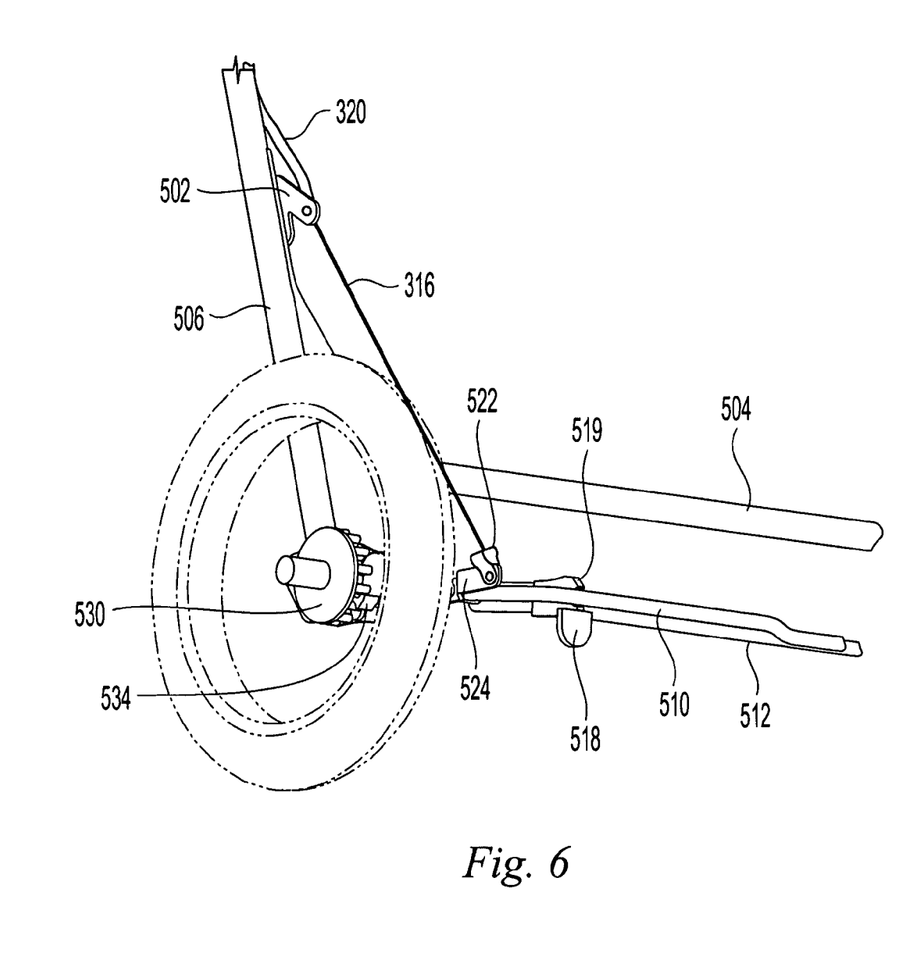
FIG. 6 shows another view of the foot-operated mechanism in the deployed position.

As seen in FIGS. 5a, 5b and 6, the brake bar 510 also is operatively connected to the brake arm 540 of the stroller 200. At its hub 530, the wheel 208b, on an inboard side of the stroller, comprises a cluster of spaced apart radial fins 532. When the brake bar 510 is stepped on, the brake arm 540 rotates slightly, causing a pawl 534 that is connected to the brake arm 540 to enter a space between adjacent fins 532 and thereby prevent rotation of the wheel 208b. In the foregoing description of the braking mechanism, only one brake arm is shown, the other rear wheel 208a having a similar brake arm for symmetrical immobilization of the rear wheels of the stroller 200.

The braking action benefits from the design of the two-piece brake bar catch 515. Unlike prior art catches for brake bars, the brake bar catch 515 has a spring-loaded endpiece 517 which allows longitudinal motion of the arcuate receiving portion 516. Because of this longitudinal motion, the arcuate receiving portion 516 is able to recede towards the axle along with the remainder of the spring-loaded endpiece 517, and then return in the rearward direction of the stroller 200, receiving a sizable circumferential extent of the axle in the process. Because of the large circumferential extent of the axle received in the arcuate receiving portion, there is a reduced chance that the brake bar 510 will accidentally be dislodged from arcuate receiving portion 516. According, the disclosed brake bar catch 515 helps ensure that the pawl 534 stays between the fins 532 between which it was inserted upon activation of the brake bar 510.

From the foregoing description, it can be seen that stepping on the brake bar 510 results in both immobilization of the stroller by preventing rotation of the rear wheels 208a, 208b, and also deployment of the stabilizing legs 202a, 202b.

To return to the retracted (and unbraked) position of FIG. 5a from the deployed (and braked) position of FIG. 5b, an operator pushes on foot release surface 518 with his or her foot and then lifts the braking bar 510 in an upward direction with the same foot. Pushing on foot release surface 518 pushes in spring-biased endpiece 517. This allows the brake bar 510 to escape the arcuate catch, thereby releasing the tension on the cable 316. Lifting the braking bar 510 with the foot assists the spring-biased horizontal rod 304 in returning to the retracted position.

Figure 7A:
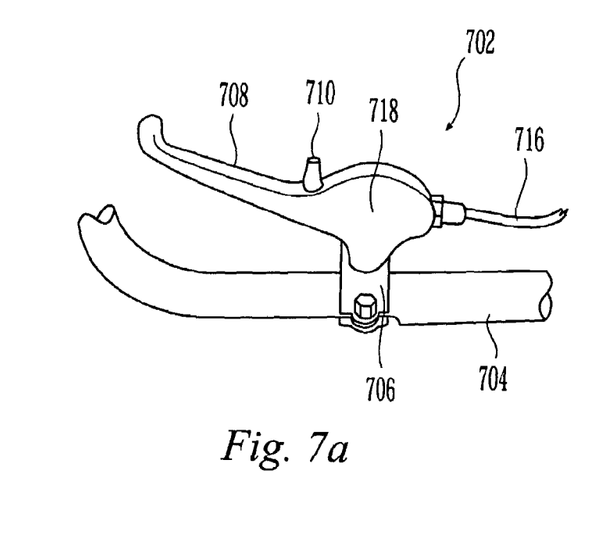
FIG. 7a shows a hand-operated actuator for operating the kickstand, in the retracted position.
Figure 7B:
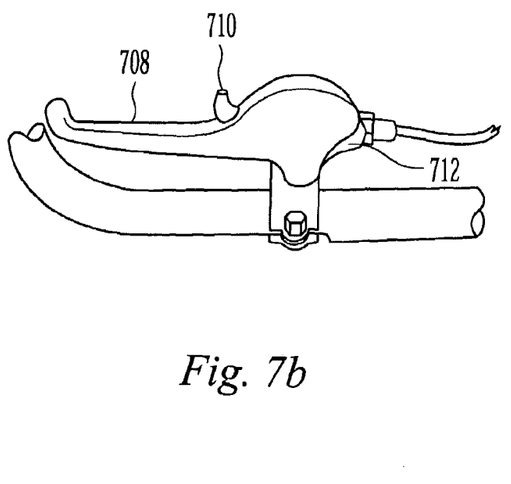
FIG. 7b shows the hand-operated actuator of FIG. 7a in the deployed position.
Figure 7C:
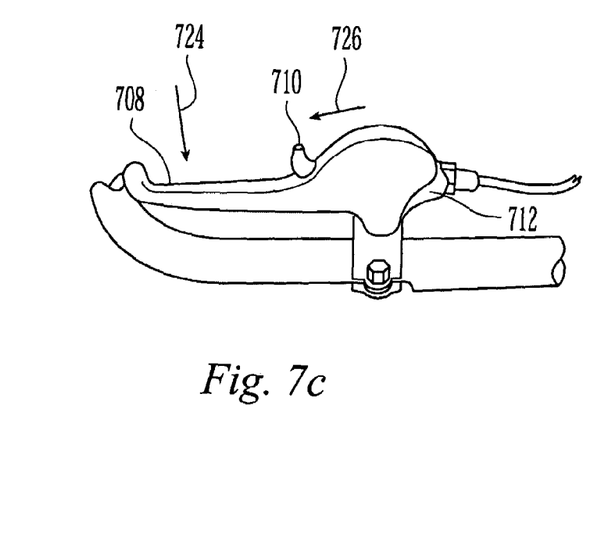
FIG. 7c illustrates the process for returning the kickstand to the retracted position from the deployed position.

As an alternative to operating the kickstand 302 with a foot-operated actuator, one may instead employ a hand-operated actuator 702, as shown in FIGS. 7a, 7b and 7c. As seen in these figures, the hand-operated actuator 702 is attached to the main stroller handle 704 at the rear of the stroller by means of a clamp 706 of the sort known to those skilled in the art. The hand-operated actuator 702 includes a pivoting lever 708, a lock release member 710 and a stationary member 712 relative to which the lever 708 pivots.

With the kickstand 302 in the retracted position, the lever 708 occupies a first position, as seen in FIG. 7a. When the lever 708 is pushed from the first position of FIG. 7a to the second, locked position seen in FIG. 7b, the cable 716 is pulled, causing the kickstand 302 to move from the retracted position to the deployed position. When the lever 708 is placed in the downward position of FIG. 7b, a ratchet-type locking mechanism of the housed within the body 718 of hand-operated actuator prevents return of the handle to the original position of FIG. 7a. This obviates that need for an operator to keep the lever 708 down to maintain the kickstand legs 202a, 202b in the deployed position.

To return the kickstand 302 to the retracted position, the operator first further depresses the lever 708 as depicted by arrow 724 to release the force exerted by the ratchet-type locking mechanism, and then slides the lock release member 710 in the direction depicted by arrow 726 to free the locking mechanism, and allow the lever 708 to return to the first position of FIG. 7c. This permits the kickstand to return to the original retracted position.

Those skilled in the art will readily recognize that the hand-operated actuator 702 is not unlike a bicycle hand-brake provided with a lock to maintain the brake. Such devices are known to those skilled in art, as exemplified by U.S. Pat. Nos. 5,887,468 and 3,800,618 whose contents are incorporated by reference.

Although the present invention has been described to a certain degree of particularity, it should be understood that various alterations and modifications could be made without departing from the scope of the invention as hereinafter claimed. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A three-wheeled stroller comprising:
a stroller frame, a front wheel and a pair of rear wheels; and a kickstand movable between a retracted position and a deployed position, the kickstand comprising at least one leg extending downwardly on one side of the front wheel in a front view of the stroller when the kickstand is in the deployed position, wherein the kickstand is remotely operated by an actuator.

2. The three-wheeled stroller according to claim 1, wherein kickstand comprises first and second legs, one leg on either side of the front wheel, in a front view of the stroller.

3. The three-wheeled stroller according to claim 2, further comprising a cable operatively connected to the kickstand and to the actuator, and configured to adjust the kickstand from at least one of the retracted and deployed positions to the other of the retracted and deployed positions.

4. The three-wheeled stroller according to claim 2, wherein the kickstand comprises a rotatably mounted rod to which the first and second legs are attached.

5. The three-wheeled stroller according to claim 2, wherein the kickstand comprises:
at least one torsion spring configured to bias the first and second legs towards the retracted position.

6. The three-wheeled stroller according to claim 2, wherein the kickstand further comprises at least one lever arm operatively connected to the legs, activation of the lever arm causing the legs to move from the retracted position to the deployed position.

7. The three-wheeled stroller according to claim 2, wherein the kickstand comprises at least one projecting tab configured to prevent over-rotation of the legs, when the legs are moved from the retracted position to the deployed position.

8. The three-wheeled stroller according to claim 2, further comprising a foot-operated actuator configured to adjust the kickstand between the retracted position to the deployed position.

9. The three-wheeled stroller according to claim 2, further comprising a cable operatively connected to the foot-operated actuator and to the kickstand, wherein stepping on the foot-operated actuator causes the cable to pull the kickstand from the retracted position into the deployed position.

10. The three-wheeled stroller according to claim 2, comprising a hand-operated actuator configured to adjust the kickstand between the retracted position and the deployed position.

11. The three-wheeled stroller according to claim 2, wherein the hand-operated actuator is provided with a lock release member which, when activated, causes the kickstand to return to the retracted position from the deployed position.

12. The three-wheeled stroller according to claim 3, further comprising an adjustable screw operatively connected to the cable and configured to determine a vertical position of the legs of the kickstand, when in the deployed position.

13. The three-wheeled stroller according to claim 3, wherein the kickstand comprises a rotatably mounted rod to which the first and second legs are attached.

14. The three-wheeled stroller according to claim 13, wherein the kickstand further comprises first and second torsion springs coaxially mounted on the rod and configured to bias the first and second legs towards the retracted position.

15. The three-wheeled stroller according to claim 13, wherein the kickstand further comprises at least one lever arm operatively connected to the rod, and the cable is attached to the lever arm.

16. The three-wheeled stroller according to claim 15, wherein the kickstand further comprises at least one projecting tab attached to the rod and configured to prevent over-rotation of the rod, when the kickstand is moved from the retracted to the deployed position.

17. The three-wheeled stroller according to claim 8, wherein the foot-operated actuator is also configured to immobilize at least one of the rear wheels.

18. The three-wheeled stroller according to claim 8, further comprising an actuator locking assembly mounted on an axle connecting the rear wheels.

19. The three-wheeled stroller according to claim 9, further comprising an adjustable screw operatively connected to the cable and configured to determine a vertical position of the legs of the kickstand, when in the deployed position.

20. The three-wheeled stroller according to claim 18, wherein the actuator locking assembly comprises:
a fixed member mounted on the axle; and
a movable member mounted on the fixed member and configured to move relative to the fixed member, a portion of the movable member being provided with:
an initial abutment surface,
a concave receiving portion adjacent to the initial abutment surface, the concave receiving portion being configured to receive at least a portion of the foot-operated actuator, and
a release surface which, when pushed, causes the movable member to move relative to the fixed member in a direction of the axle.

21. The three-wheeled stroller according to claim 20, wherein the movable member is spring-loaded.

22. In a three-wheeled stroller having a front wheel and a pair of rear wheels, the improvement comprising:
a cable-operated kickstand adjustable between a retracted position and a deployed position, the kickstand comprising a pair of legs extending downwardly on either side of the front wheel in a front view of the stroller, when the kickstand is in the deployed position.

23. The three-wheeled stroller according to claim 22, wherein the improvement further comprises:
a foot-operated actuator connected to the kickstand and configured to both adjust the kickstand between the retracted position and the deployed position, and immobilize at least one of the rear wheels.

24. The three-wheeled stroller according to claim 22, wherein the improvement further comprises:
a hand-operated actuator connected to the kickstand and configured to adjust the kickstand between the retracted position and the deployed position.

25. A method of deploying a kickstand that helps prevent tipping of a three-wheeled stroller having a front wheel and a pair of rear wheels, the method comprising:
stepping on a brake bar to thereby cause a cable to pull on a lever operatively connected to a pair of retracted legs of the kickstand,
whereby the legs move downward into a deployed position and, simultaneously, at least one rear wheel of the three-wheel stroller is immobilized.

* * * * *